United States Patent [19]

Lane

[11] 4,034,013
[45] July 5, 1977

[54] IMPACT AND MELT STRENGTH IMPROVEMENT OF POLY(ALKYLENE TEREPHTHALATE)

[75] Inventor: Constance A. Lane, Philadelphia, Pa.

[73] Assignee: Rohm and Haas Company, Philadelphia, Pa.

[22] Filed: Nov. 13, 1975

[21] Appl. No.: 631,761

[52] U.S. Cl. .............................. 260/835; 260/836
[51] Int. Cl.² .................................. C08L 63/00
[58] Field of Search ............. 260/836, 835, 837

[56] References Cited

UNITED STATES PATENTS

| | | | |
|---|---|---|---|
| 3,649,337 | 3/1972 | Johnson | 117/93.31 |
| 3,652,722 | 3/1972 | Dickie | 260/835 |
| 3,660,371 | 5/1972 | Johnson | 117/93.31 |
| 3,699,185 | 10/1972 | Dickie | 260/836 |
| 3,701,679 | 10/1972 | Johnson | 117/93.31 |
| 3,719,523 | 3/1973 | Johnson | 117/93.31 |
| 3,745,196 | 7/1973 | Lane | 260/881 |
| 3,787,522 | 1/1974 | Dickie | 260/836 |
| 3,833,683 | 9/1974 | Dickie | 260/836 |

Primary Examiner—Paul Lieberman
Attorney, Agent, or Firm—Michael B. Fein

[57] ABSTRACT

A multiple stage polymer having a rubbery first stage and an epoxy functional hard final stage, a method for improving the notched Izod impact strength and melt strength of poly(alkylene terephthalates), compositions comprising poly(alkylene terephthalates) and the multiple stage polymer, and articles molded therefrom are disclosed.

14 Claims, No Drawings

IMPACT AND MELT STRENGTH IMPROVEMENT OF POLY(ALKYLENE TEREPHTHALATE)

BACKGROUND OF THE INVENTION

DESCRIPTION OF THE PRIOR ART

Since poly(alkylene terephthalates) are generally of insufficient impact strength for molding purposes, there have been many attempts to improve the impact strength. U.S. Pat. No. 3,578,729 shows use of α-olefin-/acrylic ester copolymers; U.S. Pat. No. 3,769,620 shows terminally carboxylated α-olefin polymers such as carboxylated polyethylene for impact strength improvement; U.S. Pat. No. 3,839,499 show isotatic polybutylene-1 for this purpose; U.S. Pat. No. 3,405,198 shows polyethylene as an impact modifier; U.S. Pat. No. 3,435,093 shows ethylene/methacrylic acid; U.S. Pat. No. 3,591,659 shows polyalkyl acrylates, methacrylates, or ethacrylates for this purpose; U.S. Pat. No. 3,723,574 shows polystyrene/butadiene diols; U.S. Pat. No. 3,787,530 shows styrene/acrylonitrile; U.S. Pat. No. 3,864,428 shows ABS and MBS rubbers in combination with polycarbonate for impact modification; British Pat. No. 996,621 and U.S. Pat. Nos. 3,869,427 and 3,583,935 show reduction of free carboxyl groups in polyesters by reaction with epoxy monomers; U.S. Pat. No. 3,553,157 shows polyfunctional compounds as chain extending agents for poly(alkylene terephthalates); British Pat. No. 1,208,585 shows such a polyfunctional compound to chain extend poly(ethylene terephthalate) with the further inclusion of a rubbery impact modifier which optionally includes reactive groups such as epoxy groups which react with the polyfunctional compound so as to become grafted to the polyethylene terephthalate through the polyfunctional compound. Except for the last-mentioned patent, I am not presently aware of any prior suggestion of reactive impact modifiers for poly(alkylene terephthalates). It appears that prior workers have taken two different approaches to the problems of impact strength improvement and melt strength improvement, using separate additives to solve each problem. For example, U.S. Pat. No. 3,368,995 shows improvement of melt viscosity of poly(ethylene terephthalate) by inclusion of fiber reinforcement.

The melt viscosity and hot melt strength of highly crystalline polyesters, such as film and fiber grade poly(ethylene terephthalate), are too low to permit profile extrusion and blow molding operation. Polyester film is produced by extrusion onto chilled drums and subsequently biaxially stretch oriented at temperatures above the second order transition temperature. Very high molecular weight polyesters are required for blowing bottles. The melt viscosity of film and fiber grade poly(ethylene terephthalate) is so low that horizontal extruders can only be employed when a right angle adaptor is employed for the extrudate. Normally vertical extruders are employed.

SUMMARY OF THE INVENTION

It is an object of the present invention to provide a material which simultaneously improves notched Izod impact strength and melt strength of poly(alkylene terephthalates). It is a further object to provide poly(alkylene terephthalate) compositions having improved impact and melt strength. A still further object is to provide a method for improving poly(alkylene terephthalate). Another object is to provide molded articles of poly(alkylene terephthalates) with improved impact strength.

These objects, and others as will become apparent from the following description, are achieved by the present invention which comprises a multiple stage polymer having a rubbery first stage and an epoxy functional hard final stage. The invention also comprises the blending of such a polymer with poly(alkylene terephthalate) as well as articles molded from such blends.

DETAILED DESCRIPTION OF THE INVENTION

The multiple stage polymer having a rubbery first stage and an epoxy functional hard final stage preferably has a minimum film forming temperature above about 50° C., usually in the range of about 50° to 90° C. or higher. The first stage is polymerized from a monomer system which, if polymerized alone, would have a low $T_g$, preferably below about 10° C., and more preferably below about 0° C. Such a polymer is usually called "rubbery" and the first stage of such multiple stage polymers is usually called the "core". Rubbery polymers suitable for the core include polymers of one or more of butadiene or acrylates as the major monomers and optional minor amounts of "harder" monomers such as styrene and the like. It is preferred that the major amount of the first stage monomer system is $C_1$ to $C_{12}$ alkyl acrylate. The preferred acrylates are methyl acrylate, ethyl acrylate, butyl acrylate, 2-ethylhexyl acrylate and the like. The most preferred acrylates are n-butyl acrylate and ethyl acrylate. It is highly preferred that the first stage monomer system further include graft linking monomer. Optionally it also includes cross linking monomer.

Graft linking monomer is defined as polyethylenically unsaturated monomer which has both a highly reactive double bond and a double bond of lower reactivity such that the highly reactive double bond tends to polymerize during the first stage monomer polymerization leaving a remaining double bond for polymerization during the next stage polymerization and thereby to graft link the first stage with the second stage polymers. The preferred graft linking monomers are allyl methacrylate, allyl acrylate and diallyl maleate. From 0.05 to 3 percent graft linking monomer based on first stage monomer systems is suitable.

Cross linking monomer is also preferably present, generally in amounts of about 0.05 to 3 percent by weight based on first stage monomer system, and is defined as a polyethylenically unsaturated monomer having at least two double bonds of about equal reactivity so as to cause cross-linking in the first stage polymerization. Typical cross-linking monomers are 1,3-butylene diacrylate, 1,3-butylene dimethacrylate, divinylbenzene and the like.

The multiple state polymers are prepared sequentially by emulsion polymerization wherein each successive outer stage coats the previous stage polymer. The final stage is the relatively hard outer shell polymer.

Preferably the multiple stage polymers are produced in only two stages, but three, four, and five stage polymers are also very suitable.

The multiple stage polymers are isolated from the emulsion by spray-drying procedures or by coagulation, with the former being preferred. The isolated polymer particles are in the form of a free flowing powder as opposed to a rubber.

The first stage usually comprises about 40 to 90 percent by weight of the multiple stage polymer, preferably about 50 to 80 percent by weight. The subsequent stages can vary between low $T_g$ and high $T_g$, i.e., they can vary between rubberiness and hardness, but it is important that the final stage be polymerized from a monomer system which produces a hard polymer, i.e., a polymer having a $T_g$ of 50° C. or higher. The major part of the final stage monomer system can be any of a variety of monoethylenically unsaturated compounds including one or more of lower alkyl, cycloalkyl or aryl methacrylates, acrylates, styrenes, acrylonitrile, other monomers, and mixtures thereof. It is preferred that the major part of the monomer system be of $C_1$ to $C_{12}$ alkyl methacrylate, preferably methyl methacrylate or styrene. It is required that the final stage polymer contain epoxy functionality. By "epoxy functionality" is meant the epoxy units which are pendant from the final stage polymer. The preferred way of incorporating epoxy functionality into the final stage polymer is by use of epoxy containing monomer such as glycidyl acrylate or glycidyl methacrylate in the final stage monomer mixture. Alternative epoxy containing monomers are butadiene monoepoxide, allyl glycidyl ether, 4,5-epoxy pentyl methacrylate or acrylate, 10, 11-epoxy undecyl methacrylate, or other exposy-containing ethyleneically unsaturated monomers. Other ways of introducing epoxy functionality into the final stage of the multiple stage polymer are possible, such as post expoxidation. Preferably about 5 to 50 percent of the final stage monomer system is of epoxy-containing monomer. As measured in terms of oxirane oxygen, the multiple stage polymers contain about 0.1 to 5 weight %, preferably about 0.5 to 2.0 weight %, oxirane oxygen based on the total multiple stage polymer.

Although the multiple stage polymers do function to improve impact strength, they cannot be classified as rubbery polymers due to the fact that their minimum film forming temperature is so high, i.e., above about 50° C. Rubbery materials generally have minimum film forming temperatures below about 0° C.

The intended utility for the multiple stage polymer compositions is for blending with and resulting improvement to poly(alkylene terephthalate) esters, especially as a combination notched Izod impact strength improver and melt strength improver.

As to molding grades of poly(alkylene terephthalates), the increase in impact strength is very significant. As to fiber and film forming grades, i.e., low melt viscosity grades of such polyesters, including blow molding applications, the improvement in melt viscosity and hot melt strength provided by the multiple stage polymer is more significant. In the latter applications, the invention provides enhanced hot melt strength and melt viscosity while permitting profile extrusion and blow molding operations at normal operating temperatures. Increase in the molecular weight of the polyester alone without the modifier results in a ten-fold increase in viscosity on increasing the intrinsic viscosity from 0.7 to 1.0. Processability of this high molecular weight polyester is ver poor with extension degradation occurring at the high temperatures required for processing. The modifiers of this invention not only increase the hot melt strength and melt viscosity but also act as processing aids. Part of the invention is the method of improving the poly(alkylene terephthalates) simultaneously as to melt strength and notched Izod strength by blending the multiple stage polymers therewith.

Blending can be accomplished by melt extrusion in an extruder at temperatures of about 400° to 600° F., preferably about 450° to 525° F. For example, a high work two stage screw have a L/D ratio of about 24/1 and a compression ratio of about 3.0 to 3.5 gives a very adequate dispersion of the modifier in the polyester. A dwell time of 1 to 5 minutes is adequate to insure complete reaction under most conditions but of course lower and higher dwell times can certainly be used. Preferably the strands produced by the extruder blending are pelletized and dried to a moisture content of less than than 0.03 percent before injection molding.

During the blending process further additives can also be incorporated such as heat and light stabilizers, lubricants, dyes, pigments, mold release agents and fillers, for example, finely powdered metals, finely powdered metal oxides, graphite, carbon black, ground glass, and aluminum disulfide.

It is particularly preferred to use fibrous reinforcing agents such as, for example, asbestos fibers and special glass fibers. Typical fiber amounts are from about 5 to 60 percent by weight of a composition, preferably about 20 to 40 percent. A nucleating agent is optional but is preferred. Examples of nucleating agents are very finely divided inorganic materials such as talc, titanium dioxide, and pyrophyllite. Concentrations of about 0.01 to about 2 percent are usually adequate, with the particle size being preferably as fine as possible.

Articles can be molded from the pellets by injection molding, preferably in accordance with normal polyester molding procedures.

While wide ranges of ratios of multiple stage polymer to polyalkylene terephthalate polyester can be blended, i.e., as low as 1/200 up to as high as ½ on a weight basis, usually at least two or three percent multiple stage polymer is needed for best results. The amount used will generally be governed by the amount of impact modification and melt viscosity or melt strength increase desired. By varying the percent epoxy units in the multiple stage polymer, lower or higher increases in melt viscosity for a given increase in notched Izod impact strength can be achieved.

The preferred poly(alkylene terephthalates) are polybutylene terephthalate (PBT) and polyethylene terephthalate (PET) since these are the most commonly used. Other such as polypropylene terephthalate, polycyclohexane-1,4-dimethylol terephthalate, and blends with other polyesters are also suitable.

The following examples are presented to illustrate but a few embodiments of the invention. All parts and percentages are by weight unless otherwise indicated, and the following abbreviations are employed:

BA = n-butyl acrylate
EA = ethyl acrylate
BDA = 1,3-butylene diacrylate
AlMA = allyl methacrylate
MMA = methyl methacrylate
AN = acrylonitrile
GMA = glycidyl methacrylate
t-DoDM = t-dodecyl mercaptan
PET = poly(ethylene terephthalate)
PBT = poly(butylene terephthalate)

Standard ASTM family molds are employed. Tensile properties are determined according to ASTM-D-638; heat distortion temperature — ASTM-D-648; impact strength — ASTM-D-256; and hardness — ASTM-D-785.

EXAMPLE 1

A multiple stage polymer having a composition BA/BDA/AlMA//MMA/GMA — 70/0.35/0.28//20/10 is prepared in a reactor equipped with a stirrer, nitrogen sparge tube, addition tank and condenser, from the following ingredients which are sequentially added in two stages:

TABLE I

| CHARGE | KETTLE | 1st. Stg. CHARGE I | 2nd. Stg. CHARGE II |
|---|---|---|---|
| DI Water | 6000 | 1900 | 1300 |
| potassium carbonate | 3.7 | — | — |
| potassium dodecyl benzene sulfonate (1) | — | 128.5 | — |
| (30% in water) (2) | — | 107.0 | — |
| sodium lauryl sulfate (28% in water) | — | — | 23 |
| n-butyl acrylate | — | 5950 | — |
| 1,3-butylene diacrylate | — | 30 | — |
| allyl methacrylate | — | 24 | — |
| methyl methacrylate | — | — | 1700 |
| glycidyl methacrylate | — | — | 850 |
| potassium persulfate | 1.5 | 3.0 | 3.0 |
| in DI water | 50 | 300 | 300 |

The following procedure is used:

The kettle charge is stirred and sparged with nitrogen for 1 hour while heating to 85° C. The first soap (potassium dodecyl benzene sulfonate) charge is added to charge I to emulsify. 1156 grams of this emulsion is added to the kettle. The second charge of soap is added to the rest of charge I emulsion. At a kettle temperature of 75° C. the kettle initiator (potassium persulfate solution) is added. Within 10 minutes a blue color develops and an exotherm carries the temperature to 80° C. in eight minutes. Gradual addition of the rest of charge I emulsion and the charge I initiator is then started. The addition is completed in one hour with the exothermic reaction maintaining a temperature of 80°–5° C. After holding for one hour at 80°–5° C. the solids content is 41.5% (Theory 41.9%). Gradual addition of charge II emulsion and initiator is then started. The temperature is maintained at 80°–5° C. throughout the addition period and 30 minutes additional. The solids content of the final emulsion is 45% (Theory 46.2%). After filtering through cheesecloth the emulsion is spray dried at an inlet/outlet temperature of 150° C./50° C. to provide free-flowing powder having a minimum film forming (MFT) temperature of about 80° C.

EXAMPLES 2–5

The following multiple stage polymers are prepared using the procedure of Example 1:

| Ex. No. | Composition | Wt. Ratios | MFT (° C.) |
|---|---|---|---|
| 2 | BA/BDA/AlMA//MMA/GMA | 70/0.35/0.28//25/5 | 75 |
| 3 | BA/BDA/AlMA//MMA/GMA | 80/0.35/0.28//15/5 | 65 |
| 4 | BA/BDA/AlMA//MMA/GMA | 70/0.35/0.28//15/15 | 74 |
| 5 | BA/AlMA//MMA/GMA | 70/0.28//20/10 (0.15% t-DoDM) | 50 |
| 6 | BA/BDA/AlMA//MMA/AN/GMA | 60/0.35/0.28//25/10/5 | 83 |
| 7 | BA/BDA/AlMA//MMA/GMA | 70/0.35/0.28//20/10 (0.1% t-DoDM) | 70 |
| 8 | BA/BDA/AlMA//St/AN/GMA | 60/0.35/0.28//25/10/5 | 50 |
| 9 | BA/BDA/AlMA//MMA/GMA | 70/0.35/0.28//20/10 | 68 |

EXAMPLES 10–24

The multiple stage polymers prepared in Examples 1–9 are blended in an extruder at 490° F. with poly(ethylene terephthalate) in the ratios indicated in Table 2 and are injection molded and measured as to notched Izod impact strength. The PET contains 0.25% $TiO_2$ and has an intrinsic viscosity before blending of 0.61.

Test bars are molded in a Watson-Stillman ram type injection molding machine at 485° F./800–900 psi into a mold at 130°–150° F. The impact strength (amorphous) is measured, then the bars are crystallized by heating to 140° C. for one hour between steel plates and the impact strength (crystalline) is again measured.

The melt viscosity is measured and the results are also reported.

A comparative Example, Example 19, is also included in Table 2.

TABLE 2

| Ex. No. | Multistage % Polymer | Melt Viscosity Poise 525° F./100 sec$^{-1}$ | Notched Izod (ft.-lb./in.) Amorphous | Impact (⅛" bar) Crystalline |
|---|---|---|---|---|
| 10 | 8% Ex. 2 | 2928 | 0.81 | 0.69 |
| 11 | 10% Ex. 2 | 3294 | 0.77 | 0.72 |
| 12 | 8% Ex. 3 | 1830 | 0.82 | 0.61 |
| 13 | 10% Ex. 3 | 4758 | 0.77 | 0.76 |
| 14 | 8% Ex. 1 | 2562 | 0.86 | 0.71 |
| 15 | 10% Ex. 1 | 6039 | 0.76 | 0.68 |
| 16 | 8% Ex. 4 | 3660 | 0.91 | 0.69 |
| 17 | 10% Ex. 4 | 4392 | 0.78 | 0.69 |
| 18 | 10% Ex. 5 | 3660 | 0.81 | 0.80 |
| 19 | (Control Vs. (Ex. 10-18 | 1281 | 0.54 | 0.40 |
| 20 | 8% Ex. 6 | — | — | 0.90 |
| 21 | 8% Ex. 7 | — | — | 0.99 |
| 22 | 8% Ex. 8 | — | — | 0.58 |
| 23 | 8% Ex. 9 | — | — | 0.64 |
| 24 | 15% Ex. 9 | — | — | 0.64 |
| 14 ½ | (Control Vs. (Ex. 20-24 | — | — | 0.42 |

EXAMPLES 25-28

Following the procedure of Examples 10-24 but using a screw-ram injection molding machine with a mold temperature of 285°-300° F. and dwell time of 15-30 seconds, rigid crystalline articles are molded with little or no distortion or mold sticking problems. The results of ASTM tests D-638, D-648, D-256, and D-785 are reported in Table 3. Comparative Example 2 is also given.

TABLE 3

| Example Number | Multiple Stage Polymer | ASTM-D-638 Mod. of Tensile Elast. | ASTM-D-638 psi | ASTM-D-638 % Elong. | ASTM D-648 DTUFL 264 psi | ASTM-D-256 Izod Impact, ft.-lb/in. Notched ⅛ in. | ASTM-D-256 Notched ¼ in. | ASTM-D-256 Unnotched ⅛ in. | ASTM-D-785 Rockwell Hardness (M Scale) |
|---|---|---|---|---|---|---|---|---|---|
| 25 | Control Vs. | 408992 | 8956 | 3.1 | 86.5° C. | 0.43 | 0.49 | 3.51 | 82 |
| 26 | 15% Ex. 1 | 308370 | 5743 | 2.1 | 85° C. | 0.69 | 0.70 | 3.76 | 62 |
| 27 | 15% Ex. 7 | 329871 | 7331 | 3.6 | 83.5° C. | 0.66 | 0.80 | 3.59 | 64.5 |
| 28 | 15% Ex. 10 | 330284 | 7429 | 3.1 | 81.5° C. | 0.67 | 0.97 | 2.52 | 65 |

EXAMPLES 29 - 32

The procedure of Examples 10 to 24 is followed except for the inclusion of 30% glass fibers, with impact strengths reported in Table 4.

TABLE 4

| Example Number | Multiple Stage Polymer | Notched ⅛ in. | Unnotched ⅛ in. |
|---|---|---|---|
| 29 | Control Vs. Ex. 30-32 | 0.8 | 4.7 |
| 30 | 10% Ex. 3 | 1.1 | 8.6 |
| 31 | 10% Ex. 2 | 1.1 | 9.5 |
| 32 | 10% Ex. 5 | 1.1 | 9.8 |

EXAMPLES 33 - 39

Polymer blends with two different grades of PBT are prepared by extrusion blending at 460-480° F. and injection molding at 485° F./800 psi in the Watson-Stillman injection molding machine. The PBT samples are commercial samples of the polyester from General Electric Company and Eastman Chemical Products Inc. The results of melt viscosity and Izod impact tests are reported in Table 5.

EXAMPLE 40

This Example illustrates the dramatic improvement in melt viscosity, especially useful in fiber grades, imparted to poly(alkylene terephthalates) by the multiple stage polymers of the invention.

Dried blends of multiple stage polymer and PET having an intrinsic viscosity of 0.61 in 60/40 phenol/-tetrachloroethane and containing 0.25% $TiO_2$ are extruded at a temperature of 490° F. into strands which are pelletized and characterized for melt viscosity in a McKelvey Sieglaff capillary rheometer. The samples are exhaustively dried to <0.02% water before passing through the extruder. The viscosity achieved varied with the extent of drying and with the temperature and dwell time in the extruder. Ethyl 330 (0.25%) [1,3,5-trimethyl-2,4,6-tris(3,5-di-t-butyl-4-hydroxy benzyl) benzene] is employed as an antioxidant. The results after one and two extruder passes are reported in Table 6.

TABLE 6

| Multiple Stage Polymer | 1st Extruder Pass Poise 525° F./100 sec | 2nd Extruder Pass Poise 525° F./100 sec |
|---|---|---|
| Control | 1281 | 732 |
| 5% Ex. 7 | 2562 | 1647 |
| 10% Ex. 7 | 4209 | 2562 |
| 15% Ex. 7 | 3660 | 3843 |
| 25% Ex. 7 | 5890 | 3660 |

EXAMPLES 41 - 49

Following the procedure of Example 40, other multiple stage polymers of the invention are used with the same PET composition; with results reported in Table 7.

TABLE 5

| Example Number | PBT | Multiple Stage Polymer % Modifier | Poise 525° F./100 sec⁻¹ | ft.-lb./in.-⅛" bars Notched Izod Impact Mold 130° F. | ft.-lb./in.-⅛" bars Notched Izod Impact 1 hr. 140° C. |
|---|---|---|---|---|---|
| 33 | G. E. Valox 310 | Control Vs. Ex. 31-35 | 3294 | 0.53 | 0.60 |
| 34 | G. E. Valox 310 | 10% Example 1 | 4026 | 0.79 | 0.66 |
| 35 | G. E. Valox 310 | 8% Example 10 | 2745 | 0.79 | 0.65 |
| 36 | Eastman Tenite 6PRO | Control Vs. Ex. 37-39 | 3660 | 0.83 | 0.86 |
| 37 | Eastman Tenite 6PRO | 10% Example 7 | 4578 | 0.97 | 0.86 |
| 38 | Eastman Tenite 6PRO | 10% Example 10 | — | 0.87 | 0.46 |
| 39 | Eastman Tenite 6PRO | 10% Example 9 | — | 0.78 | 0.66 |

TABLE 7

| Example Number | Multiple Stage Polymer | % | First Extruder Pass Poise 525° F./100 sec⁻¹ |
|---|---|---|---|
| 41 | BA/BDA/AlMA//MMA/GMA 50/(.35)/(.28)//35/15 | 10 | 3660 |
| 42 | BA/BDA/AlMA//MMA/GMA 60/(.35)/(.28)//25/15 | 10 | 4758 |

TABLE 7-continued

| Example Number | Multiple Stage Polymer | % | First Extruder Pass Poise 525° F./100 sec$^{-1}$ |
|---|---|---|---|
| 43 | BA/BDA/AlMA//MMA/GMA 70/(.35)/(.28)//15/15 | 10 | 4392 |
| 44 | BA/BDA/AlMA//MMA/GMA 80/(.35)/(.28)//15/5 | 10 | 4758 |
| 45 | BA/BDA/AlMA//MMA/GMA 80/(.35)/(.28)//15/5 | 5 | 2013 |
| 46 | BA/BDA/AlMA//MMA/GMA 80/(.35)/(.28)//15/5 | 10 | 6039 |
| 47 | BA/BDA/AlMA//MMA/GMA 70/(.35)/(.28)//25/5 | 10 | 3294 |
| 48 | BA/AlMA//MMA/GMA 70/(.28)//20/10 | 10 | 3660 |
| 49 | Control Vs. Ex. 41–48 | — | 1281 |
| 50 | EA/BDA/AlMA//MMA/GMA 70/0.35/0.28//20/10 | 10 | 2379 |
| 51 | EA/BDA/AlMA//MMA/GMA 70/0.35/0.28//20/10 | 15 | 3294 |
| 52 | BA/BDA/AlMA//MMA/AN/GMA 60/0.35/0.28//25/10/5 | 15 | 1830 |
| 53 | Control Vs. Ex. 50–52 | — | 1098 |

These composition all process well at temperatures of 450°–525° F. with no excessive decomposition observed. This contrasts sharply with very high molecular weight PET which requires high processing temperatures (525°–540° F.) and exhibits extensive degradation as measured by a drop in intrinsic viscosity.

I claim:

1. A method of improving the notched Izod impact strength and the melt strength of poly(alkylene terephthalate) comprising blending therewith a multiple stage polymer having a rubbery first stage and an epoxy group-containing hard final stage, and a minimum film forming temperature above about 50° C.

2. Composition comprising poly(alkylene terephthalate) and the multiple stage polymer defined in claim 1.

3. Composition of claim 2 wherein the multiple stage polymer has a minimum film forming temperature above about 50° C.

4. Composition of claim 2 wherein the first stage polymer comprises about 40 to 90% by weight of the multiple stage polymer.

5. Composition of claim 2 wherein the final stage polymer comprises about 20 to 80 weight percent of the multiple stage polymer.

6. Composition of claim 2 wherein the rubbery first stage contains units derived from a $C_1$ to $C_{12}$ alkyl acrylate.

7. Composition of claim 6 wherein the rubbery first stage further contains units derived from crosslinking monomer and graftlinking monomer.

8. Composition of claim 7 wherein the crosslinking monomer is an alkylene diacrylate, alkylene dimethacrylate, or divinyl benzene and the graftlinking monomer is allyl methacrylate or diallyl maleate.

9. Composition of claim 2 wherein the final stage contains units derived from $C_1$ to $C_{12}$ alkyl or cycloalkyl methacrylate and epoxy units derived from glycidyl acrylate or glycidyl methacrylate.

10. Composition of claim 2 wherein the weight ratio of multiple stage polymer to poly(alkylene terephthalate) is about 1/200 to ½.

11. The composition of claim 2 further including particulate nucleating agent.

12. The composition of claim 2 further including glass fiber reinforcement.

13. Composition of claim 2 wherein the poly(alkylene terephthalate) is PBT or PET.

14. Article molded from the composition of claim 2.

* * * * *